July 14, 1936.  E. BAUMGARTNER  2,047,174
CHANGE SPEED
Filed Dec. 13, 1934
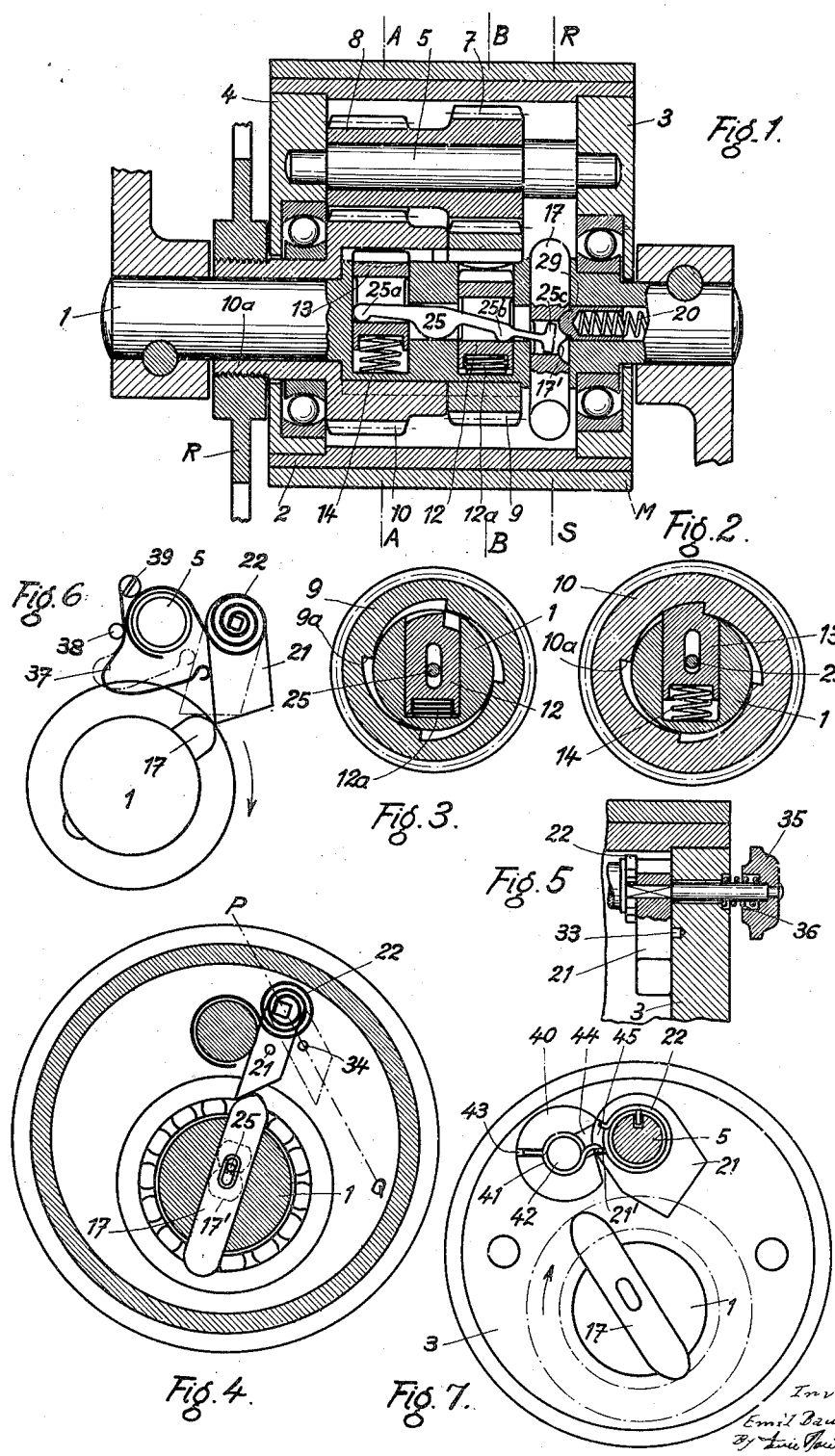

Patented July 14, 1936

2,047,174

UNITED STATES PATENT OFFICE 2,047,174

CHANGE SPEED

Emil Baumgartner, Bienne, Switzerland

Application December 13, 1934, Serial No. 757,382
In Switzerland November 8, 1934

4 Claims. (Cl. 74—367)

This invention relates to a change speed device for two speeds in bicycles where the gears remain constantly engaged and where the change speed is obtained by inverting the rotation of the pedal shaft.

The invention consists in a pedal shaft carrying by means of a free wheel mechanism as many spur wheels as there are different speeds, one of these wheels being integral with a sleeve carrying the sprocket of the chain drive and meshing like the other wheels with gears provided on a countershaft.

The pedal shaft is provided with cavities containing the free wheel mechanisms the pawls of which may be engaged or disengaged with inside clutch elements provided inside of the gear wheels of the pedal shaft by means of a swivelling member operated by means of a slide crossing the pedal shaft and worked by counter pedalling.

All the parts of the change speed mechanism are enclosed within a casing of small dimensions which in the case of a bicycle is easily inserted into the bushed boss of the frame where the pedal shaft is supported.

The above objects of the invention will be more clearly understood after considering the following description when taken in conjunction with the accompanying drawing.

Fig. 1 shows an axial section through a change speed mechanism for two speeds;

Figs. 2 and 3 are transverse sections taken on the lines A—A and B—B respectively of Fig. 1.

Fig. 4 is a section taken on the line R—S of Fig. 1 and Fig. 5 is a detail thereof in a section according to line P—Q in Fig. 4.

Fig. 6 is a diagrammatical view of the control parts and—

Fig. 7 a working example of the same.

In the Figures 1 to 5 the pedal shaft 1 is mounted in the end plates 3, 4 of a cylindrical casing 2 inserted tightly into a bush M supported by the boss (not shown) of the frame which has to receive the pedal shaft. This shaft is eccentrically disposed in relation to the cylindrical casing 2 so that by turning the casing 2 within the bush M the distance between the fore and hind axles of the bicycle may be changed to tighten or slacken the driving chain not shown. The end plates 3, 4 support also a counter shaft 5 to which is loosely fitted a sleeve formed as double pinion 7, 8.

The pedal shaft carries loosely fitted spur wheels 9 and 10 meshing with the pinions 7 and 8 respectively. The hub 10a of the toothed wheel 10 extends to the outside of the end plate 4; where it supports the sprocket R of the chain drive.

The toothed wheel 9 of smaller diameter can be fixed to the pedal shaft by means of a unidirectional coupling (see Fig. 3) for instance a free wheel mechanism comprising a pawl 12 mounted in a cavity of the pedal shaft and intended to cooperate with the clutch teeth 9a cut in the hollow inside of the spur wheel 9. The pawl 12 is actuated by a spring 12a which tends to engage it with the teeth 9a.

In a similar manner the spur wheel 10 of larger diameter can be put into working connection with the pedal shaft by means of a free wheel mechanism comprising a pawl 13 (Fig. 2) lodged within a second cavity of the pedal shaft and operated by a spring 14, which tends to engage it with the teeth 10a cut into the hollow inside of the spur wheel 10. The pawls 12 and 13 are operated against the effect of the springs 12a and 14 by means of a swivelling member 25 arranged in an axial cavity of the pedal shaft. This member is provided with a central boss working as a pivot and two bosses 25a and 25b guided within slots of the pawls 12 and 13. The arrangement is such that the oscillation of the swivel 25 alternately locks one of the pawls in its inactive position while the other pawl is set free to engage with the cooperating gear rim.

The oscillation of the swivelling member 25 in one or the other direction is produced by the displacement of a slide 17 which is to move in a transverse slot of the pedal shaft 1, the end 25c of the swivel engaging with a corresponding opening of the slide.

The slide 17 is held in its end positions by means of a pusher 29 having a rounded head, which, by the action of the spring 20, is engaged in one of the notches 17'.

The slide 17 is displaced by counter pedalling. To this end an arm 21 is pivotally mounted to the end plate 3 of the casing 2. The free end of the arm is cut like the mouth-piece of a clarinette and cooperates with one of the similar shaped extremities of the slide 17. The arm 21 is adapted to rotate in one direction against the action of a spring 22, to give free passage to the projecting end of the slide 17 during the clockwise forward run marked by an arrow; it is however prevented from rotating backwards by a stop (which in this case is given by the counter shaft 5) so that the slide is pushed back by the bevelled end of the arm 21 when the pedal shaft is turned backwards.

In order to soften the strong knock of the arm 21, striking against the stop 5 a spring of special form 37 (Fig. 6) has been provided for. This spring is bent in U-shape and, while one of its legs bears on the arm 21 to maintain this arm in a partially raised position, the other leg is held fast at its end by a screw 39 and bent at its median part inwards over a check pin 38 to increase the capacity of resistance of the spring. When the speed is changed by pedalling backwards, the arm 21 is pressed against this spring 37 whereby it is pushed backwards as shown in dotted lines on Fig. 6. After the change has been effected, the spring 37 brings the arm 21 back to its initial place. The controlling devices shown in Fig. 4 and Fig. 6 are working in the same way but with the difference that while in Fig. 4 the backwards rotating of the arm 21 is checked in a rigid manner by the countershaft 5, in Fig. 6 it is checked resiliently by the spring 37.

Another working example of the members controlling the change speed is represented in Fig. 7. The operating arm 21 of the slide 17 is directly mounted to the counter shaft 5. The free end of the arm is bevelled like the mouth-piece of a clarinette. The arm 21 rotates against the action of a spring 22 in the direction shown by the arrow in Fig. 7. In the opposite direction it is prevented from rotating by a boss 40 integral with the end plate 3 of the change speed box. The boss 40 is crossed by a screw 42 supporting a helical spring 41. One of the extremities of this spring is fixed to a groove 43, while the other end crosses a large slot 44 and is extended into an analogous opening 45 where it acts upon a nose 21' of the arm 21. The latter is therefore slightly raised as shown in Fig. 7 which represents the inactive position of the arm 21. During the forward run, the slide 17 with both ends alternately abuts against the arm 21 which is thus slightly raised. The stroke of rotation of the arm 21 is however very small, as the spring 22 is bringing the latter always back into the initial position. When rotated in the opposite direction by counter-pedalling, the slide 17 abuts against the arm 21. The latter is stopped by the boss 40 while the cam surface of the slide and the slot of the arm 21 are sliding one upon the other thus producing the displacement of the slide 17 and consequently the change of speed. The spring 41 located in the boss 40 represses the shock produced by the lever 21 striking suddenly against the stopping member 40.

The working principle of the mechanism is as follows: In the high speed position (direct engagement) the pawl 13 drives the spur wheel 10 with the guided shaft 10a. The pawl 12 of the pedal shaft 1 is locked by the boss 25b in the inactive position of the swivel 25. In this way the spur wheel 9 is disengaged and rotates faster than the pedal shaft 1; this would also be the case if the pawl 12 were not locked, however the characteristic noise of the free wheel mechanism could not be avoided. In the low speed position the pawl 12 is free to drive the spur wheel 9; the pawl 13 in turn is locked by the boss 25a of the swivel and the two shafts 1 and 10a are connected to each other through the gears 9—7—8—10.

In order to prevent the arm 21 from being struck at every revolution of the pedal shaft during the forward run, it may be held apart by means of a pin 33 engaged with a hole 34, provided in the cover 3 of the change speed box (see Figs. 4 and 5). For this purpose the arm is supported by an axially displaceable pin extended to the outside of the box and provided with an operating button 35. A spring 36 inserted between the cover and the button keeps the arm 21 close to the end plate 3. To disengage the arm 21, the cyclist before pedalling in the counter direction presses upon the button 35 whereby the pin 33 is set free. In the forward run, the arm 21 is automatically brought into inactive position by means of the slide 17.

The change speeds described in their application to a bicycle and controlled by counter-pedalling may also be used in other machines, for example in a machine tool. They may be actuated by any counter-rotation of the main shaft on which are mounted the gears by means of a free wheel arrangement. The details of the realization according to the present invention may differ from the working examples described above without departing from the spirit of the invention.

What I claim is:—

1. A variable speed transmission comprising a casing provided with side plates, a drive shaft mounted in said side plates, gear wheels of different diameters loosely mounted on said drive shaft and provided with unidirectional internal clutch teeth, a driven shaft in the form of a sleeve mounted on said drive shaft and integral with one of said gear wheels, a countershaft, a double gear loosely mounted on the countershaft and meshing with the gear wheels on said drive shaft, and a clutch mechanism comprising a slidable pawl for each gear wheel arranged in slots of the drive shaft and adapted to engage the clutch teeth of said gear wheels, a spring urging each pawl into engagement with the teeth of said gear wheels, a swivel member pivotally held within an axial cavity of the drive shaft and guided within slots of the pawls and in contact with the same to counteract the springs of the pawls, a slide member having bevelled ends and movable in a transverse slot in the drive shaft and slotted to receive the end of the swivel member, an arm pivotally mounted on one of the end plates of the casing, and a spring urging the arm to a position against the counter shaft, said arm being provided with a bevelled end arranged to meet one of the bevelled ends of the slide and operable when the drive shaft is rotating in its normal direction to override the slide and operable when the drive shaft is rotated in the opposite direction to engage and shift the slide.

2. In a variable speed transmission according to claim 1, in combination, a spring-controlled pusher ending into a rounded head and lodged in one of the end plates of the casing to cooperate with notches in the slide marking the end positions of the same.

3. In a variable speed transmission according to claim 1, in combination, a stub shaft axially displaceable through the side of said casing for pivotally supporting said arm, a spring urging said stub shaft to a position to maintain said arm against said casing side, and a pin carried by said arm adapted to enter a recess in the side of the casing to lock said arm in a determined position.

4. In a variable speed arrangement according to claim 1, in combination, a buffer device adapted to soften the shocks of the arm against the check member and comprising a bent flat spring attached at one end to the end plate of the casing and bearing with its other end against the arm and a check pin in contact with the median part of said spring and arranged to increase the bend of the spring when the arm is assuming its position of rest.

EMIL BAUMGARTNER.